United States Patent
Wang et al.

(10) Patent No.: US 10,237,769 B2
(45) Date of Patent: Mar. 19, 2019

(54) JOINT USER CLUSTERING AND POWER ALLOCATION METHOD AND BASE STATION USING THE SAME

(71) Applicant: National Tsing Hua University, Hsinchu (TW)

(72) Inventors: Chin-Liang Wang, Hsinchu (TW); Jen-Hao Liu, Chiayi (TW); Jyun-Yu Chen, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 8 days.

(21) Appl. No.: 15/657,211

(22) Filed: Jul. 24, 2017

(65) Prior Publication Data
US 2018/0234867 A1   Aug. 16, 2018

(30) Foreign Application Priority Data
Feb. 14, 2017   (TW) .............................. 106104709 A (51) Int. Cl.
*H04W 24/08*   (2009.01)
*H04W 72/04*   (2009.01)
(Continued)

(52) U.S. Cl.
CPC .............. *H04W 24/08* (2013.01); *H04L 5/00* (2013.01); *H04W 52/24* (2013.01); *H04W 52/241* (2013.01); *H04W 52/346* (2013.01); *H04W 72/0473* (2013.01); *H04W 72/085* (2013.01); *H04W 52/146* (2013.01); *H04W 88/02* (2013.01); *H04W 88/08* (2013.01)

(58) Field of Classification Search
None
See application file for complete search history.

(56) References Cited

U.S. PATENT DOCUMENTS

2014/0314006 A1* 10/2014 Suh ...................... H04B 7/0452
                                                        370/329
2015/0156786 A1*  6/2015 Kim ..................... H04B 7/0452
                                                        370/329
(Continued)

FOREIGN PATENT DOCUMENTS

| CN | 104640220 | 5/2015 |
| CN | 105634664 | 6/2016 |
| TW | 201620279 | 6/2016 |

*Primary Examiner* — Ayaz R Sheikh
*Assistant Examiner* — Faiyazkhan Ghafoerkhan
(74) *Attorney, Agent, or Firm* — JCIPRNET (57) ABSTRACT

This invention provides a joint user clustering and power allocation method and a base station using the same. They are applicable to cooperative non-orthogonal multiple access (NOMA) systems. The method includes: sorting K user equipment devices (UEs) according to the K channel gains between the base station and the K UEs, and then establishing a strong user candidate group of K/2 UEs and a weak user candidate group of K/2 UEs; pairing each of the UEs in the strong user candidate group with each of the UEs in the weak user candidate group so as to divide the K UEs into K/2 clusters, where the power allocation coefficients for each pair of UEs are also calculated during the paring process; and transmitting messages to the K UEs based on the calculated power allocation coefficients of the K/2 clusters.

12 Claims, 3 Drawing Sheets

(51) Int. Cl.
*H04W 72/08* (2009.01)
*H04W 52/24* (2009.01)
*H04L 5/00* (2006.01)
*H04W 52/34* (2009.01)
*H04W 88/02* (2009.01)
*H04W 88/08* (2009.01)
*H04W 52/14* (2009.01)

(56) References Cited

U.S. PATENT DOCUMENTS

| | | | |
|---|---|---|---|
| 2015/0171947 A1* | 6/2015 | Sun | H04W 4/08 370/329 |
| 2015/0282185 A1* | 10/2015 | Nikopour | H04L 1/0002 370/329 |
| 2016/0065257 A1* | 3/2016 | Fujii | H04B 7/0413 375/267 |
| 2017/0257868 A1* | 9/2017 | Wang | H04W 72/0466 |
| 2018/0192424 A1* | 7/2018 | Zhang | H04L 27/3411 |

\* cited by examiner

JOINT USER CLUSTERING AND POWER ALLOCATION METHOD AND BASE STATION USING THE SAME

CROSS-REFERENCE TO RELATED APPLICATION

This application claims the priority benefit of Taiwan application serial no. 106104709, filed on Feb. 14, 2017. The entirety of the above-mentioned patent application is hereby incorporated by reference herein and made a part of this specification.

BACKGROUND OF THE INVENTION

1. Field of the Invention

The invention relates to a joint user clustering and power allocation method, and more particularly, to a joint user clustering and power allocation method applicable to downlink cooperative non-orthogonal multiple access (NOMA) systems.

2. Description of Related Art

Owing to the capability of providing higher transmission rates than the traditional multiple access techniques under the same bandwidth resources, non-orthogonal multiple access (NOMA) is considered as one of the promising multiple access candidate techniques in the fifth generation wireless communication systems.

In a NOMA system, user multiplexing can be performed in the power domain at the transmitter, and multiple user signals can be separated at the receiver later by using a successive interference cancellation (SIC) technique. Specifically, for a two-user NOMA system, it is assumed that the user equipment device (UE) with a poorer channel condition is referred to as a weak user and the other UE with a better channel condition is referred to as a strong user. In order to correctly demodulate each user's signal at the corresponding UE, the NOMA system allocates more transmission power for the weak user and allows the strong user to decode its own signal by executing the SIC technique. It should be noted that, during the SIC procedure, the strong user can also detect signals to be transmitted to the weak user by a base station. For that reason, a technique that assigns the strong user to serve as a relay node between the base station and the weak user has been developed to improve the signal reception quality for the weak user.

Such a technique mainly combines a cooperative communication system architecture with the NOMA technique, which is also known as a cooperative NOMA system. However, in the related techniques, it is assumed that the transmission powers of the UEs in a cooperative NOMA system are fixed for ease of performance analysis.

Apart from that, in order to apply NOMA systems to the actual environment, multiuser interference is also one of the challenges that should be overcome. Despite the presence of techniques for mitigating the multiuser interference by dividing the UEs into multiple clusters, a user clustering algorithm has not yet been investigated exclusively for the UEs in a cooperative NOMA system.

Therefore, given that a cooperative NOMA system is able to improve the system performance, finding a way to properly divide the UEs into multiple clusters in the system while providing optimization in terms of power allocation coefficients is indeed one of the issues to be addressed in related fields.

SUMMARY OF THE INVENTION

The invention provides a joint user clustering and power allocation method, which is applicable to a base station for transmitting messages to K user equipment devices (UEs) being divided into N clusters, where K is an even number greater than 2 and N=K/2. The method includes steps of: sorting the K UEs in descending order according to channel gains between the base station and the K UEs; setting N leading UEs among the sorted UEs as a strong user candidate group, and setting N remaining UEs among the sorted UEs as a weak user candidate group; pairing each UE in the strong user candidate group with each UE in the weak user candidate group in a one-to-one manner and simultaneously calculating power allocation coefficients and transmission powers corresponding to two UEs in each of pairing combinations so as to divide the K UEs into the N clusters; and transmitting the messages to the K UEs according to the transmission powers corresponding to the UEs in the N clusters.

In an embodiment of the invention, the method for simultaneously calculating the power allocation coefficients and the transmission powers corresponding to the two UEs in each of the pairing combinations in the pairing process includes: calculating the power allocation coefficients and the transmission powers corresponding to the two UEs based on maximizing a cluster received signal-to-noise ratio (SNR) corresponding to the two UEs for each of the pairing combinations, where the cluster received SNR is, for example, a smallest one of received SNRs corresponding to the two UEs, but the invention is not limited thereto; a first channel gain of the first UE is greater than a second channel gain of the second UE in the two UEs; the transmission powers include a first transmission power of a first signal to be transmitted to the first UE, a second transmission power of a second signal to be transmitted to the second UE, and a third transmission power for forwarding a decoding result of the second signal from the first UE to the second UE; a sum of the first transmission power, the second transmission power, and the third transmission power is less than or equal to a total transmission power, each of the first transmission power, the second transmission power, and the third transmission power is greater than 0, and the second transmission power is greater than the first transmission power; and the cluster received SNR includes a first SNR of the first signal decoded at the first UE, a second SNR of the second signal decoded at the first UE, and a third SNR of the second signal decoded at the second UE.

In an embodiment of the invention, the step of calculating the power allocation coefficients and the transmission powers corresponding to the two UEs based on maximizing the cluster received SNR corresponding to the two UEs for each of the pairing combinations includes: setting the corresponding first transmissions power to be $\alpha_n$ times the total transmission power, the corresponding second transmission power to be $\beta_n$ times the total transmission power, and the corresponding third transmission power to be $(1-\alpha_n-\beta_n)$ times the total transmission power, where $\alpha_n$ is a first power allocation coefficient with $0<\alpha_n<1$ and $\beta_n$ is a second power allocation coefficient with $0<\beta_n<1$; expressing the corresponding first SNR by a first function having the first power allocation coefficient, expressing the corresponding second SNR by a second function having the first power allocation coefficient and the second power allocation coefficient, and expressing the corresponding third SNR by a third function having the first power allocation coefficient and the second power allocation coefficient; setting a first intersection point of the first function and the second function to be equal to a second intersection point of the first function and the third function so as to obtain a cubic function associated with the first power allocation coefficient; calculating solutions of the cubic function, where one of the solutions is an optimal solution of the first power allocation coefficient; substituting the optimal solution of the first power allocation coefficient into the second function to calculate an optimal solution of the second power allocation coefficient; and calculating the first transmission power based on the optimal solution of the first power allocation coefficient, calculating the second transmission power based on the optimal solution of the second power allocation coefficient, and calculating the third transmission power based on the optimal solution of the first power allocation coefficient and the optimal solution of the second power allocation coefficient.

In an embodiment of the invention, the first function is a strictly increasing function of the first power allocation coefficient, and each of the second function and the third function is a strictly decreasing function of the first power allocation coefficient.

In an embodiment of the invention, the second function is a strictly increasing function of the second power allocation coefficient and the third function is a strictly decreasing function of the second power allocation coefficient.

In an embodiment of the invention, the step of pairing each UE in the strong user candidate group with each UE in the weak user candidate group in a one-to-one manner so as to divide the K UEs into the N clusters includes: pairing each UE in the strong user candidate group with each UE in the weak user candidate group and calculating an equivalent received SNR corresponding to each of the pairing combinations, where the equivalent received SNR is, for example, a smaller one of the second SNR and the third SNR corresponding to the two UEs plus the first SNR, but the invention is not limited thereto; and dividing the K UEs into the N clusters according to the calculated equivalent received SNR.

In an embodiment of the invention, the step of dividing the K UEs into the N clusters according to the calculated equivalent received SNR includes: selecting a first pairing combination having a greatest equivalent received SNR and a second pairing combination having a second greatest equivalent received SNR for each UE in the strong user candidate group; for each UE in the strong user candidate group, calculating a difference between the greatest equivalent received SNR and the second greatest equivalent received SNR, which is known as an equivalent SNR loss; selecting the first pairing combination corresponding to the UE having the greatest equivalent SNR loss from the strong user candidate group to be one of the N clusters; deleting the strong UE and the weak UE in the selected first pairing combination from the strong user candidate group and the weak user candidate group; and repeating aforementioned steps until both the strong user candidate group and the weak user candidate group are empty.

The invention provides a base station, which is applicable to cooperative NOMA systems. The base station includes a transceiver circuit, a storage circuit and a processing circuit. The transceiver circuit is configured to transmit messages to K UEs being divided into N clusters, where K is an even number greater than or equal to 2 and N=K/2. The storage unit stores a plurality of program codes. The processing circuit is coupled to the transceiver circuit and the storage circuit, and configured to execute the following operations: sorting the K UEs in descending order according to channel gains between the base station and the K UEs; setting N leading UEs among the sorted UEs as a strong user candidate group, and setting N remaining UEs among the sorted UEs as a weak user candidate group; pairing each UE in the strong user candidate group with each UE in the weak user candidate group in a one-to-one manner and simultaneously calculating power allocation coefficients and transmission powers corresponding to two UEs in each of pairing combinations so as to divide the K UEs into the N clusters; and transmitting the messages to the K UEs according to the transmission powers corresponding to the N clusters.

In an embodiment of the invention, the processing circuit is further configured to execute: calculating the power allocation coefficients and the transmission powers corresponding to the two UEs based on maximizing a cluster received signal-to-noise ratio (SNR) corresponding to the two UEs for each of the pairing combinations, where the cluster received SNR is, for example, a smallest one of received SNRs corresponding to the two UEs, but the invention is not limited thereto; a first channel gain of the first UE is greater than a second channel gain of the second UE in the two UEs; the transmission powers include a first transmission power of a first signal to be transmitted to the first UE, a second transmission power of a second signal to be transmitted to the second UE, and a third transmission power for forwarding a decoding result of the second signal from the first UE to the second UE; a sum of the first transmission power, the second transmission power, and the third transmission power is less than or equal to a total transmission power, each of the first transmission power, the second transmission power, and the third transmission power is greater than 0, and the second transmission power is greater than the first transmission power; and the cluster received SNR includes a first SNR of the first signal decoded at the first UE, a second SNR of the second signal decoded at the first UE, and a third SNR of the second signal decoded at the second UE.

In an embodiment of the invention, the processing circuit is further configured to execute: setting the corresponding first transmissions power to be $\alpha_n$ times the total transmission power, the corresponding second transmission power to be $\beta_n$ times the total transmission power, and the corresponding third transmission power to be $(1-\alpha_n-\beta_n)$ times the total transmission power, where $\alpha_n$ is a first power allocation coefficient with $0<\alpha_n<1$ and $\beta_n$ is a second power allocation coefficient with $0<\beta_n<1$; expressing the corresponding first SNR by a first function having the first power allocation coefficient, expressing the corresponding second SNR by a second function having the first power allocation coefficient and the second power allocation coefficient, and expressing the corresponding third SNR by a third function having the first power allocation coefficient and the second power allocation coefficient; setting a first intersection point of the first function and the second function to be equal to a second intersection point of the first function and the third function so as to obtain a cubic function associated with the first power allocation coefficient; calculating solutions of the cubic function, where one of the solutions is an optimal solution of the first power allocation coefficient; substituting the optimal solution of the first power allocation coefficient into the second function to calculate an optimal solution of the second power allocation coefficient; and calculating the first transmission power based on the optimal solution of the first power allocation coefficient, calculating the second transmission power based on the optimal solution of the second power allocation coefficient, and calculating the third transmission power based on the optimal solution of the first power allocation coefficient and the optimal solution of the second power allocation coefficient.

In an embodiment of the invention, the first function is a strictly increasing function of the first power allocation coefficient, and each of the second function and the third function is a strictly decreasing function of the first power allocation coefficient.

In an embodiment of the invention, the second function is a strictly increasing function of the second power allocation coefficient and the third function is a strictly decreasing function of the second power allocation coefficient.

In an embodiment of the invention, the processing circuit is further configured to execute: pairing each UE in the strong user candidate group with each UE in the weak user candidate group and calculating an equivalent received SNR corresponding to each of the pairing combinations, where the equivalent received SNR is, for example, a smaller one of the second SNR and the third SNR corresponding to the two UEs plus the first SNR, but the invention is not limited thereto; and dividing the K UEs into the N clusters according to the calculated equivalent received SNR.

In an embodiment of the invention, the processing circuit is further configured to execute: selecting a first pairing combination having a greatest equivalent received SNR and a second pairing combination having a second greatest equivalent received SNR for each UE in the strong user candidate group; for each UE in the strong user candidate group, calculating a difference between the greatest equivalent received SNR and the second greatest equivalent received SNR, which is known as an equivalent SNR loss; selecting the first pairing combination corresponding to the UE having the greatest equivalent SNR loss from the strong user candidate group to be one of the N clusters; deleting the strong UE and the weak UE in the selected first pairing combination from the strong user candidate group and the weak user candidate group; and repeating aforementioned steps until both the strong user candidate group and the weak user candidate group are empty.

A joint user clustering and power allocation method and a base station using this method are proposed according to the embodiments of the invention. The base station using such a method first divides the UEs into the strong user candidate group and the weak user candidate group according to the channel gain of each UE in the system, and calculates the power allocation coefficients and the transmission powers according to a cluster received SNR corresponding each of the pairing combinations constituted by each UE in the strong user candidate group and each UE in the weak user candidate group. Then, the clustering of UEs is finally decided according to an equivalent received SNR corresponding to each of the pairing combinations so as to provide a fast method to search for a second optimal user pairing combination. To sum up, the technique provided by the invention can effectively reduce the complexity of the user clustering in a downlink cooperative NOMA system while effectively improving its transmission performance and system capacity.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
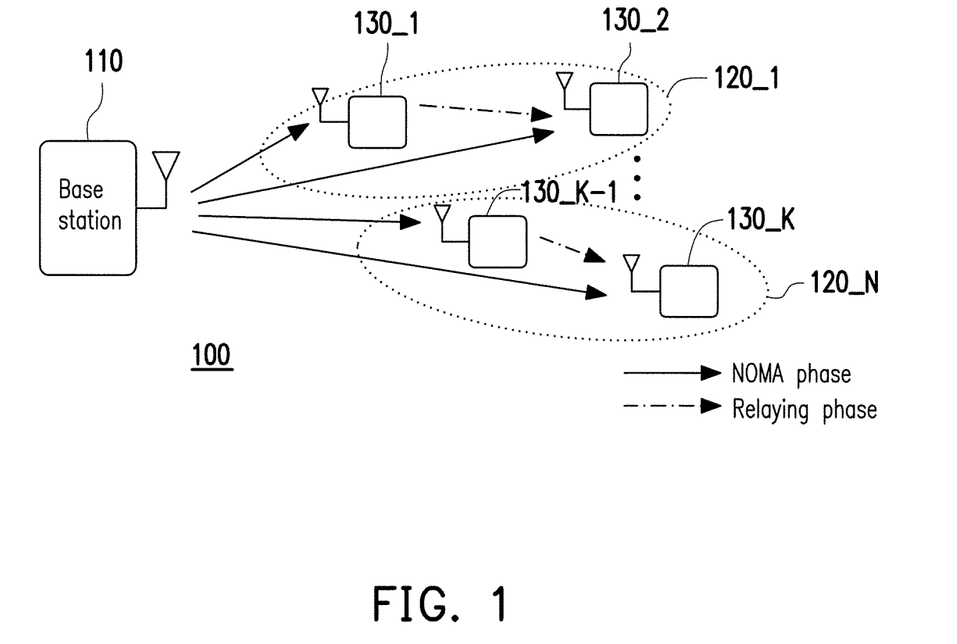
FIG. 1 is a schematic diagram illustrating a downlink cooperative NOMA system according to an embodiment of the invention.

FIG. 1 is a schematic diagram illustrating a downlink cooperative NOMA system according to an embodiment of the invention. In the embodiments of the invention, a downlink cooperative NOMA system 100 includes a base station 110 and K UEs being divided into N clusters (i.e., clusters 120_1, . . . , 120_N and UEs 130_1, 130_2, . . . , 130_K-1 and 130_K). Among them, different clusters are allocated with orthogonal resources, and each cluster includes two UEs sharing the same channel resource. Accordingly, the number K of the UEs in the downlink cooperative NOMA system is an even number greater than or equal to 2 (i.e., K≥2 and K is the even number), and N=K/2.

In addition, in practical applications, the base station 110 and the UEs (130_1, 130_2, . . . , 130_K-1 and 130_K) can be configured with $N_T$ and $N_R$ antennas respectively to form the downlink system 100 with the multiple-input multiple-output NOMA (MIMO-NOMA). $N_T$ and $N_R$ may be any positive integers greater than 1. However, in the following embodiments, the base station 110 and the UEs 130_1, 130_2, . . . , 130_K-1 and 130_K of the invention are described with use of single-antenna to simplify the system architecture.

In the present embodiment, the UEs 130_1, 130_2, . . . , 130_K-1 and 130_K may be implemented by (but not limited to), for example, a mobile station, an advanced mobile station (AMS), a server, a user terminal, a desktop computer, a laptop computer, a network computer, a workstation, a personal digital assistant (PDA), a tablet personal computer (tablet PC), a scanner, a phone device, a pager, a camera, a television, a handheld video game device, a music device, a wireless sensor or the like, which are not particularly limited by the invention.

In the present embodiment, the base station 110 may include (but not limited to), for example, an eNB, a home eNB, an advanced base station (ABS), a base transceiver system (BTS), an access point, a home BS, a relay, an intermediate node, an intermediate equipment device and/or a satellite-based communication base station, but the implementation of the invention is not limited to the above.

In terms of hardware, the base station 110 can at least include (but not limited to) a transceiver circuit, a processing circuit and a storage circuit (optional). The transceiver circuit may include a transmitter circuit, an A/D (analog-to-digital) converter, a D/A converter, a low noise amplifier, a mixer, a filter, an impedance matcher, a transmission line, a power amplifier, one or more antenna circuits and a local storage medium element (but the invention is not limited thereto), such that the base station 110 can provide wireless transmitting/receiving functions to the UEs (i.e., the UEs 130_1, 130_2, ..., 130_K–1 and 130_K). The storage circuit is, for example, a memory, a hard disk or other elements capable of storing data, and may be configured to record a plurality of program codes or modules.

The processing circuit is configured to process digital signals and execute functions, procedures or steps in the method proposed in the exemplary embodiments of the invention. In addition, the processing circuit may be optionally coupled to a memory circuit for storing programming codes, device configurations, codebooks and buffer or permanent data. Functions of the processing circuit 120 may be implemented by using a programmable unit, such as a microprocessor, a microcontroller, a DSP chip, and a FPGA. The functions of the processing circuit may also be implemented by using an independent electronic device or an IC, and the processing circuit may also be implemented in form of hardware or software.

On the other hand, there are two transmission phases (an NOMA phase and a relaying phase) for each cluster in the downlink cooperative NOMA system 100, and system models corresponding the phases will be described in more detail below.

First of all, in the NOMA phase, it is assumed that any two UEs among the UEs 130_1, 130_2, ..., 130_K–1 and 130_K are assigned to the same cluster. For example, a k-th UE and a l-th UE are assigned to an n-th cluster (where 0<n<N). Because the two UEs in the same cluster share the same channel, a signal to be transmitted to the k-th UE and the l-th UE in the n-th cluster can be represented by:

$$x_n = \sqrt{P_{S,n}} s_k + \sqrt{P_{W,n}} s_l, \quad \text{Equation (1)}$$

where $P_{S,n}$ and $P_{W,n}$ are transmission powers for transmitting signals $s_k$ and $s_l$ to the k-th UE and the l-th UE, respectively. It should be noted that, data signal can be normalized as $E[|s_m|^2]1$, $m \in S$, where $E[\cdot]$ denotes a statistical expectation value.

Further, a signal received by an m-th UE can be represented by:

$$y_m = h_m x_n + w_m, m \in k, l, \quad \text{Equation (2)}$$

where $h_m$ denotes a transmission channel between the base station 110 and the m-th UE (it is assumed herein that the transmission channel is a global channel state information), $w_m$ denotes a reception noise at the m-th UE and $w_m$ is, for example, an additive white Gaussian noise (AWGN), but the invention is not limited to the above.

It should be noted that, it is assumed herein that a channel gain of the k-th UE is greater than a channel gain of the l-th UE (i.e., $|h_k|^2 > |h_l|^2$). Therefore, it is defined that the k-th UE is a strong user and the l-th UE is a weak user. According to principle of the NOMA technique, a transmission power allocation for the strong user should be smaller than a transmission power allocation for the weak user (i.e., $P_{S,n} < P_{W,n}$). As such, minor interference induced by the signal of the strong user may be regarded as a noise for the weak user, and thus its own data signal can be directly decoded. The strong user can easily remove the decoded signal of the weak user through the SIC procedure. Without loss of generality, all noise variances are assumed to be identical and can be represented by $\sigma^2$. However, the invention is not limited thereto. Therefore, during the SIC procedure, a received signal-to-noise ratio (SNR) of the signal $s_l$ of the weak user (the l-th UE) to be decoded by the strong user (the k-th UE) can be represented by:

$$SNR_{k,l} = \frac{|h_k|^2 P_{W,n}}{|h_k|^2 P_{S,n} + \sigma^2} \quad \text{Equation (3)}$$

After the signal $s_l$ of the weak user (the l-th UE) is decoded and removed, a received SNR of the data signal $s_k$ to be decoded by the strong user (the k-th UE) itself can be expressed as:

$$SNR_{k,k} = \frac{|h_k|^2 P_{S,n}}{\sigma^2} \quad \text{Equation (4)}$$

Next, in the relaying phase, a decode-and-forward strategy is applied to the strong user so as to facilitate forwarding the decoded signal $s_l$ to the weak user. Accordingly, the signal received by the l-th UE in the relaying phase can be represented by:

$$z_l = g_{k,l} \sqrt{P_{R,n}} s_l + v_l, \quad \text{Equation (5)}$$

where $P_{R,n}$ is a transmission power for transmitting the signal $s_l$ from the strong user to the l-th UE, $g_{k,l}$ is a coefficient of Rayleigh fading channel between the k-th UE and the l-th UE, $v_l$ is a reception noise at the l-th UE and $v_l$ is, for example, an additive white Gaussian noise, but the invention is not limited to the above.

After this phase, the l-th UE can, for example, adopt a maximum ratio combining (MRC) to combine the signals received in the NOMA phase and the relaying phase, but the invention is not limited thereto. Accordingly, the received SNR of the signal $s_l$ to be decoded by the weak user (the l-th UE) itself may be expressed as:

$$SNR_{l,l} = \frac{|h_l|^2 P_{W,n}}{|h_l|^2 P_{S,n} + \sigma^2} + \frac{|g_{k,l}|^2 P_{R,n}}{\sigma^2} \quad \text{Equation (6)}$$

To sum up aforesaid two transmission phases, an equivalent received SNR of the k-th UE and the l-th UE assigned to the same cluster, can be expressed as:

$$\gamma_{k,l} = SNR_{k,k} + \min\{SNR_{k,l}, SNR_{l,l}\} \quad \text{Equation (7)}$$

Furthermore, if one binary indicator variable $\psi_{k,l}$ is defined to indicate the clustering method of the K UEs for the downlink cooperative NOMA system 100 as:

$$\psi_{k,l} = \begin{cases} 1, & \text{If } k\text{-}th \text{ user is paired with the } l\text{-}th \text{ user} \\ 0, & \text{others} \end{cases} \quad \text{Equation (8)}$$

and if the K UEs are sorted in descending order according to their own channel gains (i.e., $|h_1|^2 > |h_2|^2 > \ldots > |h_K|^2$), an overall equivalent received SNR of the downlink cooperative NOMA system 100 can be expressed as:

$$\gamma_{overall} = \sum_{k=1}^{K} \sum_{l=k+1}^{K} \psi_{k,l} \gamma_{k,l} \quad \text{Equation (9)}$$

To effectively improve the performance of the downlink cooperative NOMA system 100, the invention intends to maximize the overall equivalent received SNR of the system by properly allocating transmission powers to the UES in combination with better user clustering approach. On that basis, an optimization problem based on maximizing the overall equivalent received SNR of the downlink cooperative NOMA system 100 under the constraints combining the user clustering and the power allocation can be formulated as:

$$\max_{\Psi,P} \gamma_{overall} \qquad \text{Equation (10a)}$$

$$\text{subject to} \sum_{l=k+1}^{K} \psi_{k,l} \leq 1, \forall k \qquad \text{Equation (10b)}$$

$$\sum_{k=1}^{l-1} \psi_{k,l} \leq 1, \forall l \qquad \text{Equation (10c)}$$

$$P_{S,n} + P_{W,n} + P_{R,n} \leq P_T \qquad \text{Equation (10d)}$$

$$P_{S,n}, P_{W,n}, P_{R,n} > 0, P_{W,n} > P_{S,n} \qquad \text{Equation (10e)}$$

where $\Psi$ denotes a pairing matrix for assigning specific clusters, and $\overline{P}$ denotes a power allocation matrix. In this optimization problem, Equations (10b) and (10c) are used to guarantee that the UE can be paired with only one UE other than itself. Equation (10d) is a total transmission power constraint for one single cluster. Equation (10e) reflects the fact that the base station 110 and the strong user transmit the signals by using none-zero transmission power.

In order to find the better user clustering method and the power allocation method associated with each UE based on optimizing Equations (10), it is assumed that the invention is capable of calculating the transmission powers corresponding to the two UEs based on maximizing a cluster received SNR of two UEs in any cluster. After that, pairing combinations of user clustering that can achieve Equation (10a) are then found.

In the present embodiment, the transmission powers corresponding the two UEs in the n-th cluster are calculated by optimizing the equivalent received SNR shown by Equation (7) in the invention, where $0 < n < N$. It should be noted that, for a given cluster, based on the decode-and-forward strategy used at the strong user, the strong user needs to fully decode the signals to be transmitted to the weak user by the base station 110. Meanwhile, a sufficient received SNR should also be provided by the base station 110 to the strong user and the weak user for decoding their own signals. Thus, from the fairness point of view, the equivalent received SNR shown by Equation (7) above can be obtained by maximizing one single cluster received SNR in Equation (11) below:

$$\max_{P_{S,n},P_{W,n},P_{R,n}} \min\{SNR_{k,k}, SNR_{k,l}, SNR_{l,l}\} \qquad \text{Equation (11a)}$$

$$\text{subject to } P_{S,n} + P_{W,n} + P_{R,n} \leq P_T \qquad \text{Equation (11b)}$$

$$P_{S,n} + P_{W,n} + P_{R,n} > 0, P_{W,n} > P_{S,n} \qquad \text{Equation (11c)}$$

According to Equation (11a), the transmission powers corresponding to the k-th UE and the l-th UE in the n-th cluster includes a transmission power $P_{S,n}$ of the signal $s_k$ to be transmitted to the k-th UE, a transmission power $P_{W,n}$ of the signal $s_l$ to be transmitted to the l-th UE, and a transmission power $P_{R,n}$ for transmitting the signal $s_l$ from the k-th UE to the l-th UE. According to Equations (11b) and (11c), a sum of the transmission powers $P_{S,n}$, $P_{W,n}$ and $P_{R,n}$ is less than or equal to a total transmission power $P_T$; each of the transmission powers $P_{S,n}$, $P_{W,n}$ and $P_{R,n}$ is greater than 0; and $P_{W,n}$ is greater than $P_{S,n}$. Moreover, the cluster received SNR includes a SNR $SNR_{k,k}$ of the signal $s_k$ decoded at the k-th UE, a SNR $SNR_{l,l}$ of the signal $s_l$ decoded at the l-th UE, and a SNR $SNR_{k,l}$ of the signal $s_l$ decoded at the k-th UE.

Figure 2:
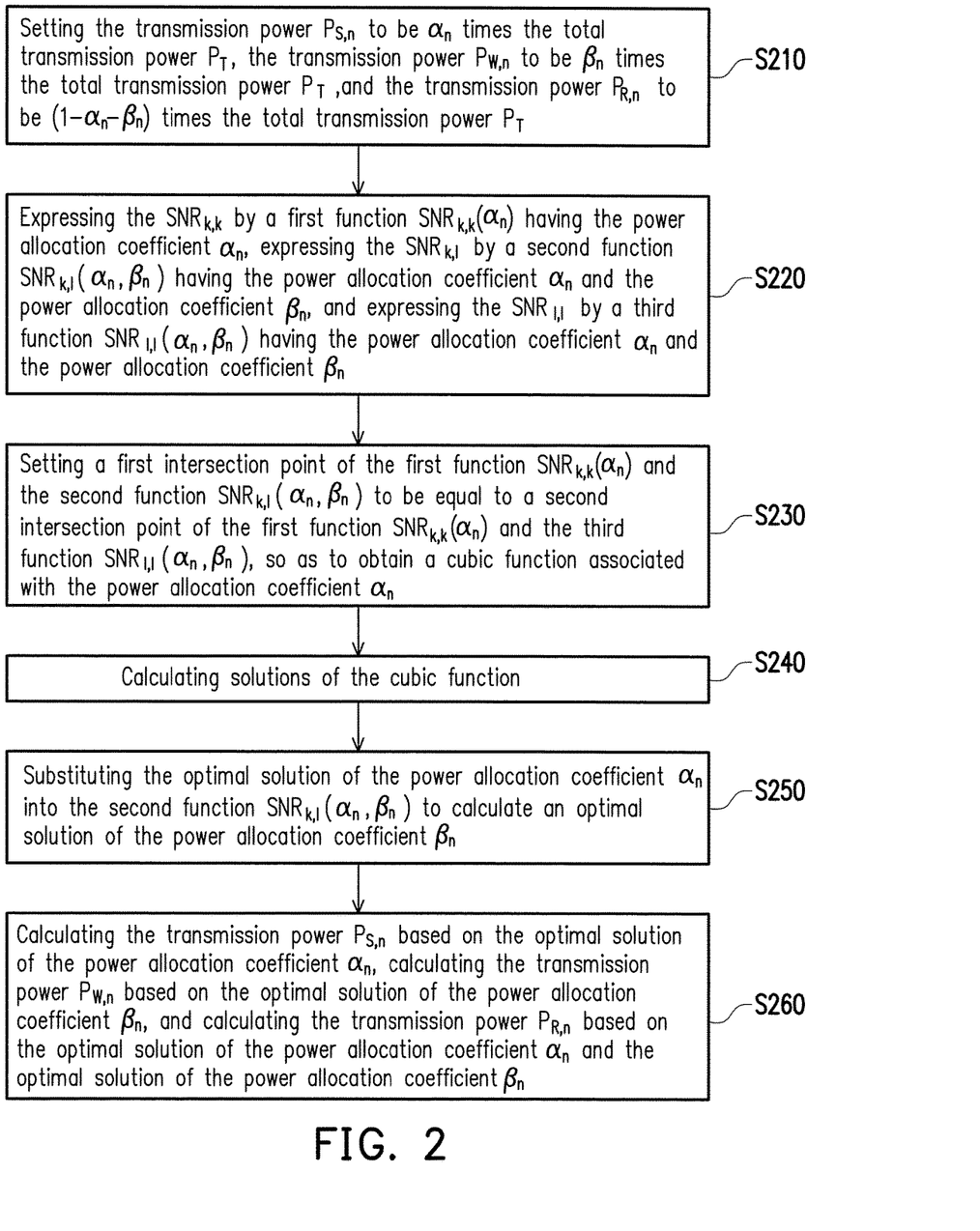
FIG. 2 is a flowchart illustrating a method for calculating the power allocation coefficients and the transmission powers of the UEs according to an embodiment of the invention.

To describe how to calculate the transmission powers of the two UEs based on maximizing the cluster received SNR of the two UEs in any cluster by using Equation (11) more clearly, FIG. 2 shows a flowchart illustrating a method for calculating power allocation coefficients and transmission powers of UEs according to an embodiment of the invention, and the method of FIG. 2 can be executed by the base station 110.

In step S210, the base station 110 sets the transmission power $P_{S,n}$ to be $\alpha_n$ times the total transmission power $P_T$, the transmission power $P_{W,n}$ to be $\beta_n$ times the total transmission power $P_T$, and the transmission power $P_{R,n}$ to be $(1-\alpha_n-\beta_n)$ times the total transmission power $P_T$. In the present embodiment, $\alpha_n$ is a power allocation coefficient of the transmission power $P_{S,n}$ and $0 < \alpha_n < 1$. $\beta_n$ is a power allocation coefficient of the transmission power $P_{W,n}$ and $0 < \beta_n < 1$.

In step S220, the base station 110 expresses the SNR $SNR_{k,k}$ by a first function $SNR_{k,k}(\alpha_n)$ having the power allocation coefficient $\alpha_n$, expresses the SNR $SNR_{k,l}$ by a second function $SNR_{k,l}(\alpha_n,\beta_n)$ having the power allocation coefficient $\alpha_n$ and the power allocation coefficient $\beta_n$, and expresses the SNR $SNR_{l,l}$ by a third function $SNR_{l,l}(\alpha_n,\beta_n)$ having the power allocation coefficient $\alpha_n$ and the power allocation coefficient $\beta_n$.

In the present embodiment, expressions regarding the first function $SNR_{k,k}(\alpha_n)$, the second function $SNR_{k,l}(\alpha_n,\beta_n)$, and the third function $SNR_{l,l}(\alpha_n,\beta_n)$ can refer to the following Equations (12), (13) and (14), respectively, $$SNR_{k,k}(\alpha_n) = \rho |h_k|^2 \alpha_n \qquad \text{Equation (12)}$$

$$SNR_{k,l}(\alpha_n, \beta_n) = \frac{|h_k|^2 \beta_n}{|h_k|^2 + \rho^{-1}} \qquad \text{Equation (13)}$$

$$SNR_{l,l}(\alpha_n, \beta_n) = \frac{|h_l|^2 \beta_n}{|h_l|^2 + \rho^{-1}} + \rho |g_{k,l}|^2 (1 - \alpha_n - \beta_n) \qquad \text{Equation (14)}$$

Accordingly, the optimization problem for maximizing the one single cluster received SNR in the present embodiment can also be formulated by functions with $\alpha_n$ and $\beta_n$, as shown below:

$$\max_{\{\alpha_n,\beta_n\}} \min\{SNR_{k,k}(\alpha_n), SNR_{k,l}(\alpha_n, \beta_n), SNR_{l,l}(\alpha_n, \beta_n)\} \qquad \text{Equation (15a)}$$

$$\text{subject to } \alpha_n + \beta_n < 1 \qquad \text{Equation (15b)}$$

$$\beta_n > \alpha_n > 0 \qquad \text{Equation (15c)}$$

It should be noted that the first function $SNR_{k,k}(\alpha_n)$ is a strictly increasing function of the power allocation coefficient $\alpha_n$ and each of the second function $SNR_{k,l}(\alpha_n,\beta_n)$ and the third function $SNR_{l,l}(\alpha_n,\beta_n)$ is a strictly decreasing function of the power allocation coefficient $\alpha_n$. Thus, mathematically, the second function $SNR_{k,l}(\alpha_n,\beta_n)$ and the third function $SNR_{l,l}(\alpha_n,\beta_n)$ have two intersection points intersected with the first function $SNR_{k,k}(\alpha_n)$, which can be respectively expressed as:

$$\beta_{1,n} = \rho|h_k|^2\alpha_n^2 + \alpha_n \quad \text{Equation (16)}$$

$$\beta_{2,n} = \frac{(\rho|h_k|^2|h_l|^2 + \rho|h_l|^2|g_{k,l}|)\alpha_n^2 + (|h_k|^2 + |g_{k,l}|^2 - \rho|h_l|^2|g_{k,l}|^2)\alpha_n - |g_{k,l}|^2}{|h_l|^2 - |g_{k,l}|^2 - \rho|h_l|^2|g_{k,l}|^2\alpha_n} \quad \text{Equation (17)}$$

In addition, the second function $SNR_{k,l}(\alpha_n,\beta_n)$ is a strictly increasing function of the power allocation coefficient $\beta_n$, and the third function $SNR_{l,l}(\alpha_n,\beta_n)$ is a strictly decreasing function of the power allocation coefficient $\beta_n$ having $|g_{k,l}|^2 > |h_l|^2/(\rho|h_l|^2\alpha_n+1)$. Said condition $|g_{k,l}|^2 > |h_l|^2/(\rho|h_l|^2\alpha_n+1)$ indicates that, since the MRC technique with decode-and-forward relaying are employed to combine the received signals during the two phases for the weak user, the channel gains for the two phases should have sufficient strength to provide good enough signal quality for detection. In this case, an objective function of Equation (15a) can be maximized when the Equations (16) and (17) are equated.

Accordingly, in step S230, the base station 110 sets a first intersection point of the first function $SNR_{k,k}(\alpha_n)$ and the second function $SNR_{k,l}(\alpha_n,\beta_n)$ to be equal to a second intersection point of the first function $SNR_{k,k}(\alpha_n)$ and the third function $SNR_{l,l}(\alpha_n,\beta_n)$, so as to obtain a cubic function associated with the power allocation coefficient $\alpha_2$.

In the present embodiment, such cubic function can be expressed as $a\alpha_n^3 + b\alpha_n^2 + c\alpha_n + d = 0$, where $a = \rho|h_k|^2|h_l|^2|g_{k,l}|^2$, $b = \rho|g_{k,l}|^2(|h_k|^2 + 2|h_l|^2)$, $c = |h_k|^2 - |h_l|^2 + \rho|h_l|^2|g_{k,l}|^2$ and $d = -|g_{k,l}|^2$.

In step S240, the base station 110 calculates solutions of the cubic function, where one of the solutions of the cubic function is an optimal solution $\alpha_n^{opt}$ of the power allocation coefficient $\alpha_n$.

In the present embodiment, the solutions of the cubic function are calculated by using a trigonometric method, but the invention is not limited thereto. Three solutions of the cubic function can be expressed as:

$$\alpha_{1,n} = -\frac{b}{3a} + 2\sqrt{-f}\cos\left[\frac{\cos^{-1}(e/(-f)^{3/2})}{3}\right] \quad \text{Equation (18)}$$

$$\alpha_{2,n} = -\frac{b}{3a} + 2\sqrt{-f}\cos\left[\frac{\cos^{-1}(e/(-f)^{3/2}) + 2\pi}{3}\right] \quad \text{Equation (19)}$$

$$\alpha_{3,n} = -\frac{b}{3a} + 2\sqrt{-f}\cos\left[\frac{\cos^{-1}(e/(-f)^{3/2}) - 2\pi}{3}\right] \quad \text{Equation (20)}$$

where $e = (-b^3/27a^3) - (d/2a) + (bc/6a^2)$ and $f = (c/3a) - (b^2/9a^2)$.

In the invention, the solutions of the cubic function are verified by discriminant expressed as $\delta = e^2 + f^3$. When $\delta > 0$, the cubic function has one real root and two complex conjugate roots. When $\delta = 0$, the cubic function has three real roots. When $\delta < 0$, the cubic function has three different real roots. $\alpha_{1,n}\alpha_{2,n}\alpha_{3,n} = -d/a > 0$ means that the cubic function at least includes one positive real root and $\alpha_{1,n} + \alpha_{2,n} + \alpha_{3,n} = -b/a < 0$ means that the real part of the other two roots is negative. In other words, because only one solution among the three solutions can serve as the power allocation coefficient, the optimal solution $\alpha_n^{opt}$ of the power allocation coefficient $\alpha_n$ can be obtained as:

$$\alpha_n^{opt} = \max\{Re\{\alpha_{1,n}, \alpha_{2,n}, \alpha_{3,n}\}\} \quad \text{Equation (21)}$$

In step S250, the base station 110 substitutes the optimal solution $\alpha_n^{opt}$ of the power allocation coefficient $\alpha_n$ into the second function $SNR_{k,l}(\alpha_n,\beta_n)$ to calculate an optimal solution $\beta_n^{opt}$ of the power allocation coefficient $\beta_n$. In the present embodiment, after substituting Equation (21) into Equation (16), the optimal solution $\beta_n^{opt}$ of the power allocation coefficient $\beta_n$ can be calculated as:

$$\beta_n^{opt} = \rho|h_k|^2(\alpha_n^{opt})^2 + \alpha_n^{opt} \quad \text{Equation (22)}$$

In step S260, the base station 110 calculates the transmission power $P_{S,n}$ based on the optimal solution $\alpha_n^{opt}$ of the power allocation coefficient $\alpha_n$, calculates the transmission power $P_{W,n}$ based on the optimal solution $\beta_n^{opt}$ of the power allocation coefficient $\beta_n$, and calculates the transmission power $P_{R,n}$ based on the optimal solution $\alpha_n^{opt}$ of the power allocation coefficient $\alpha_n$ and the optimal solution $\beta_n^{opt}$ of the power allocation coefficient $\beta_n$.

Accordingly, after going through steps S210 to S260 as mentioned above, the base station 110 can calculate optimal transmission powers (i.e., the transmission powers $P_{S,n}$, $P_{W,n}$ and $P_{R,n}$) corresponding to two UEs in one cluster based on maximizing one single cluster received SNR. In addition, the equivalent received SNR corresponding to the two UEs assigned to the same cluster can also be obtained through Equation (7) after substituting the optimal solution $\alpha_n^{opt}$ of the power allocation coefficient $\alpha_n$ and the optimal solution $\beta_n^{opt}$ of the power allocation coefficient $\beta_n$ into Equations (12) to (14).

Next, after deciding the corresponding optimal transmission powers corresponding to the two UEs in one single cluster, the base station 110 continues to search for the pairing combinations of user clustering that can achieve Equation (10a).

It should be noted that, since the optimal transmission powers corresponding to the two UEs in one single cluster are already decided, in order to assign the UEs to each cluster more preferably, it is considered herein to give a specific value T of the objective function in Equation (12) for a given user pair. That is to say, when $SNR_{k,k}(\alpha_n) = T$, the power allocation coefficient $\alpha_n$ can be expressed as:

$$\alpha_n = \frac{T}{\rho|h_k|^2} \quad \text{Equation (23)}$$

When $SNR_{k,l}(\alpha_n,\beta_n) = T$, by substituting Equation (23) into Equation (13), the power allocation coefficient $\beta_n$ can be expressed as:

$$\beta_n = \frac{T}{\rho|h_k|^2}(T+1) \quad \text{Equation (24)}$$

Moreover, by substituting Equations (23) and (24) into Equation (14), the following condition can be obtained to realize T as follows:

$$|g_{k,l}|^2 \geq \frac{T|h_k|^2(|h_k|^2 - |h_l|^2)}{\rho|h_k|^2(|h_k|^2 + T|h_l|^2) - (T^2 + 2T)(|h_k|^2 + T|h_l|^2)} \quad \text{Equation (25)}$$

Equation (25) implies that the channel gain $|g_{k,l}|^2$ between strong user and weak user must be greater than one particular value so as to attain a certain performance. In addition, due to $|g_{k,l}|^2 > 0$, the denominator of the lower bound of Equation (25) must also be greater than 0, and thus $\rho|h_k|^2 > (T^2+2T)$ can be derived. In other words, as the transmitted SNR $\rho$ increases, since the lower bound of the channel gain $|g_{k,l}|^2$ between the strong user and the weak user can be decreased to achieve the specific value T, $|g_{k,l}|^2$ is more likely to satisfy the condition in Equation (25). Accordingly, the upper bound of the received SNR for the given user pair can be expressed as:

$$T < \sqrt{\rho|h_k|^2+1} - 1 \qquad \text{Equation (26)}$$

The upper bound of Equation (26) shows that the received SNR corresponding to the user pair only depends on the SNR and the channel gains transmitted between the base station and the strong user. In other words, not only is the performance of user clustering affected by the channel gain of the strong user in each cluster, the strong user also decides a greatest received SNR for one cluster.

Figure 3:
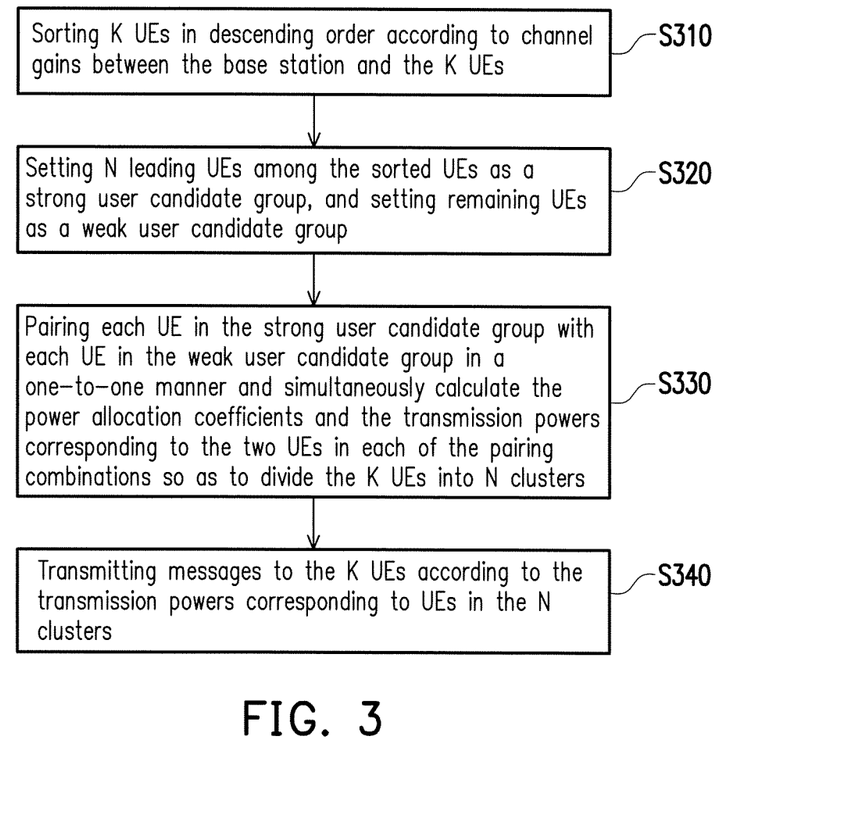
FIG. 3 is a flowchart illustrating a joint user clustering and power allocation method according to an embodiment of the invention.

Based on that, FIG. 3 is a flowchart illustrating a joint user clustering and power allocation method according to an embodiment of the invention. The method of FIG. 3 can also be executed by the base station 110. Each step in the joint user clustering and power allocation method of FIG. 3 is described with reference to the system architecture of FIG. 1.

In step S310, the base station 110 sorts K UEs in descending order according to channel gains between the base station and the K UEs.

In the present embodiment, if the channel gains of the base station 110 with respect to the UEs 130_1, 130_2, ..., 130_K-1 and 130_K are sorted in descending order as a sequence of $|h_1|^2 > |h_2|^2 > ... > |h_K|^2$, the base station 110 sorts the UEs 130_1, 130_2, ..., 130_K-1 and 130_K according to such sequence.

In step S320, the base station 110 sets N leading UEs among the sorted UEs as a strong user candidate group, and sets remaining UEs as a weak user candidate group.

In the present embodiment, given that the performance of user clustering is affected by the channel gain of the strong user in each cluster, hence, the base station 110 sets the first N leading UEs (i.e., UEs 130_1, 130_2, ..., 130_N-1 and 130_N) as the strong user candidate group, and sets the rest of UEs (i.e., UEs 130_N+1, ..., 130_K-1 and 130_K) as the weak user candidate group. It should be noted that, in the following steps, the base station 110 intends to pair each UE in the strong user candidate group with each UE in the weak user candidate group in a one-to-one manner so that each two of the K UEs are grouped into one cluster, where N=K/2.

In step S330, the base station 110 pairs each UE in the strong user candidate group with each UE in the weak user candidate group in a one-to-one manner and simultaneously calculate the power allocation coefficients and the transmission powers corresponding to the two UEs in each of the pairing combinations so as to divide the K UEs into N clusters.

In the present embodiment, the base station 110 pairs each UE in the strong user candidate group with all the UEs in the weak user candidate group and calculates the equivalent received SNR corresponding to each pair. It should be noted that, the equivalent received SNR of each pair can be obtained through Equation (7) after substituting the power allocation coefficient corresponding to the two UEs in the cluster obtained from the steps of FIG. 2 into Equations (12) to (14). It is worth mentioning that, to simplify the complexity of the system, formula solutions of the power allocation coefficients and the channel gains (i.e., $|h_k|^2$, $|h_l|^2$ and $|g_{k,l}|^2$) in Equations (12) to (14) may also be replaced by a stable channel characteristic, which are not particularly limited in the invention.

Next, the base station 110 decides a pairing combination for each UE in the strong user candidate group and each UE in the weak user candidate group according to the equivalent received SNR so as to divide the K UEs into the N clusters. Specifically, the base station 110 selects, for each UE in the strong user candidate group, the UE having a greatest value of the equivalent received SNR in the UEs pairing with the UE in the strong user candidate group. In addition, the base station 110 further selects, for each UE in the strong user candidate group, the UE having a second greatest value of the equivalent received SNR in the UEs pairing with the UE in the strong user candidate. Then, the base station 110 calculates an equivalent SNR loss for each UE in the strong user candidate group. The equivalent SNR loss is a difference between a greatest equivalent received SNR and a second greatest equivalent received SNR. The base station 110 selects the UE having the equivalent SNR loss being a maximal value in the strong user candidate group to be one strong user in one pairing combination and the paired UE in the weak user candidate group corresponding to the equivalent received SNR having the maximal value to be one weak user in said pairing combination, and uses such pairing combination as one of the N clusters. This means that, such user clustering can pair the UE in the strong user candidate group in the pairing having the greatest value of the equivalent received SNR with the UE in the weak user candidate group in the pairing having the greatest value of the equivalent received SNR and can avoid the UE in the strong user candidate group in the pairing having the second greatest value of the equivalent received SNR from being paired with the UE in the weak user candidate group in the pairing having the second greatest value of the equivalent received SNR (i.e., to avoid using poorer equivalent SNR).

Subsequently, the base station 110 removes the paired strong user from the strong user candidate group and removes the paired weak user from the weak user candidate group. In this way, the base station 110 repeats aforementioned steps until the strong user candidate group and the weak user candidate group are empty. As a result, the base station 110 can pair each UE in the strong user candidate group with each UE in the weak user candidate group in a one-to-one manner, so as to divide the K UEs into the N clusters.

It should be noted that, the user clustering method as proposed above may not always guarantee that the optimization problem of Equation (10) is in the optimal state, rather, it can provide a fast method to search for the second optimal user pair.

In one embodiment of the invention, deciding the pairings for each UE in the strong user candidate group with the UE in the weak user candidate group to divide the K UEs into the N clusters can be implemented using a matrix, but the invention is not limited thereto. In the present embodiment, it is assumed that the downlink cooperative NOMA system 100 has 8 UEs (i.e., the UEs 130_1, 130_2, ..., 130_8), the strong user candidate group includes the UEs 130_1, 130_2, 130_3 and 130_4, and the weak user candidate group includes the UEs 130_5, 130_6, 130_7 and 130_8. In order to pair each UE in the strong user candidate group with each UE in the user candidate group, the base station 110 creates a first user pairing matrix $\overline{Q}$ in 4×4 dimension, as shown below:

$$\overline{Q} = \begin{bmatrix} q_{1,1} & q_{1,2} & q_{1,3} & q_{1,4} \\ q_{2,1} & q_{2,2} & q_{2,3} & q_{2,4} \\ q_{3,1} & q_{3,2} & q_{3,3} & q_{3,4} \\ q_{4,1} & q_{4,2} & q_{4,3} & q_{4,4} \end{bmatrix} \quad \text{Equation (27)}$$

wherein the elements in the first user pairing matrix $\overline{Q}$ are defined by $q_{i,j} = \gamma_{i,j+4}$, i, j∈{1,2,3,4}, which represents the equivalent received SNR of the i-th UE and the (j+4)-th UE assigned to the same cluster (which can be calculated with reference to Equation (7)). For instance, $q_{1,1} = \gamma_{1,5}$ denotes the equivalent received SNR corresponding the paring of the UE 130_1 in the user candidate group with the UE 130_5 in the weak user candidate group.

In Equation (27), it is assumed that $q_{1,3}$, $q_{2,4}$, $q_{3,1}$ and $q_{4,1}$ are the elements having the greatest value in each row in the first user pairing matrix $\overline{Q}$, and $q_{1,1}$, $q_{2,3}$, $q_{3,3}$ and $q_{4,4}$ are the elements having the second greatest value in each row of the first user pairing matrix $\overline{Q}$. Next, a second user pairing matrix $\overline{R}$ can be created accordingly as follows:

$$\overline{R} = \begin{bmatrix} q_{1,3} - q_{1,1} \\ q_{2,3} - q_{2,4} \\ q_{3,3} - q_{3,1} \\ q_{4,4} - q_{4,1} \end{bmatrix} \quad \text{Equation (28)}$$

wherein each row in the second user pairing matrix $\overline{R}$ is defined corresponding to the equivalent SNR loss of each UE in the strong user candidate group.

If $(q_{1,3} - q_{1,1})$ is the greatest one among four values, the base station 110 selects the UE 130_1 in the strong user candidate group to be a strong user in one pairing combination, selects the UE 130_5 in the weak user candidate group to be a weak user in such pairing combination, and then use the pairing combination to be one of four clusters. Then, the base station 110 removes the first row and the third column in the first user pairing matrix $\overline{Q}$. In this way, the base station 110 can repeat aforesaid assigning steps until the first user pairing matrix $\overline{Q}$ becomes one empty matrix. By doing so, the base station 110 can divide the eight UEs in the downlink cooperative NOMA system 100 into four clusters.

Lastly, in step S340, the base station 110 transmits messages to the K UEs according to the transmission powers corresponding to UEs in the N clusters.

In the present embodiment, based on maximizing one cluster received SNR of two UEs in each cluster, the base station 110 calculates the transmission powers of the two UEs so as to obtain the transmission powers corresponding to the K UEs. It is worth mentioning that, in each of the clusters, one UE is associated with the strong user candidate group, whereas the other UE is associated with the weak user candidate group. Hence, the constraint condition for calculating the power allocation coefficients and the transmission powers (i.e., $|h_k|^2 > |h_l|^2$ or $P_{S,n} < P_{W,n}$) corresponding to the two UE in any cluster as described in the steps of FIG. 2 is satisfied. Therefore, the power allocation coefficient and transmission power corresponding to each UE in the N clusters can be calculated based on the steps of FIG. 2, such that the base station 110 can transmit the message to the K UEs accordingly.

In summary, a joint user clustering and power allocation method and a base station using this method are proposed according to the embodiments of the invention. The base station using such a method first divides the UEs into the strong user candidate group and the weak user candidate group according to the channel gain of each UE in the system, and then decides the user clustering according to the equivalent received SNR corresponding to the pairing combinations for each UE in the strong user candidate group with each UE in the weak user candidate group, so as to provide a fast method to search for the second optimal user pairing combination. In addition, the base station using such a method calculates the transmission powers corresponding to the two UEs in each cluster based on maximizing the cluster received SNR in one single cluster. To sum up, the technique provided by the invention can effectively reduce the complexity of the user clustering in a downlink cooperative NOMA system while effectively improving its transmission performance and system capacity.

It will be apparent to those skilled in the art that various modifications and variations can be made to the structure of the present invention without departing from the scope or spirit of the invention. In view of the foregoing, it is intended that the present invention covers such modifications and variations provided they fall within the scope of the following claims and their equivalents.

What is claimed is:

1. A joint user clustering and power allocation method applicable to a base station for transmitting messages to K user equipment devices (UEs) being divided into N clusters in cooperative non-orthogonal multiple access (NOMA) systems, wherein K is an even number greater than or equal to 2 and N=K/2, and the method comprises:
    sorting the K UEs in descending order according to K channel gains between the base station and the K UEs;
    setting N leading UEs among the sorted UEs as a strong user candidate group, and setting N remaining UEs among the sorted UEs as a weak user candidate group;
    pairing each UE in the strong user candidate group with each UE in the weak user candidate group and simultaneously calculating power allocation coefficients and transmission powers corresponding to two UEs in each of pairing combinations so as to divide the K UEs into the N clusters, comprising:
        calculating the power allocation coefficients and the transmission powers corresponding to the two UEs based on maximizing a cluster received signal-to-noise ratio (SNR) corresponding to the two UEs for each of the pairing combinations,
    wherein the two UEs comprise a first UE associated with the strong user candidate group and a second UE associated with the weak user candidate group,
    the cluster received SNR is a smallest one of received SNRs corresponding to the two UEs,
    a first channel gain of the first UE is greater than a second channel gain of the second UE,
    the transmission powers comprise a first transmission power of a first signal to be transmitted to the first UE, a second transmission power of a second signal to be transmitted to the second UE, and a third transmission power for forwarding a decoding result of the second signal from the first UE to the second UE, a sum of the first transmission power, the second transmission power, and the third transmission power is less than or equal to a total transmission power, each of the first transmission power, the second transmission power, and the third transmission power is greater than 0, and the second transmission power is greater than the first transmission power, and the received SNRs corresponding to the two UEs comprise a first SNR of the first signal decoded at the first UE, a second SNR of the second signal decoded at the first UE, and a third SNR of the second signal decoded at the second UE; and transmitting the messages to the K UEs according to the transmission powers corresponding to the UEs in the N clusters.

2. The joint user clustering and power allocation method according to claim 1, wherein the step of calculating the power allocation coefficients and the transmission powers corresponding to the two UEs based on maximizing the cluster received SNR corresponding to the two UEs for each of the pairing combinations comprises:

correspondingly setting the first transmissions power to be $\alpha_n$ times the total transmission power, the second transmission power to be $\beta_n$ times the total transmission power, and the third transmission power to be $(1-\alpha_n-\beta_n)$ times the total transmission power, wherein $\alpha_n$ is defined as a first power allocation coefficient with $0<\alpha_n<1$ and $\beta_n$ is defined as a second power allocation coefficient with $0<\beta_n<1$;

expressing the first SNR by a first function having the first power allocation coefficient, expressing the second SNR by a second function having the first power allocation coefficient and the second power allocation coefficient, and expressing the third SNR by a third function having the first power allocation coefficient and the second power allocation coefficient;

setting a first intersection point of the first function and the second function to be equal to a second intersection point of the first function and the third function so as to obtain a cubic function associated with the first power allocation coefficient;

calculating solutions of the cubic function, wherein one of the solutions is an optimal solution of the first power allocation coefficient;

substituting the optimal solution of the first power allocation coefficient into the second function to calculate an optimal solution of the second power allocation coefficient; and calculating the first transmission power based on the optimal solution of the first power allocation coefficient, calculating the second transmission power based on the optimal solution of the second power allocation coefficient, and calculating the third transmission power based on the optimal solution of the first power allocation coefficient and the optimal solution of the second power allocation coefficient.

3. The joint user clustering and power allocation method according to claim 2, wherein the first function is a strictly increasing function of the first power allocation coefficient, and each of the second function and the third function is a strictly decreasing function of the first power allocation coefficient.

4. The joint user clustering and power allocation method according to claim 2, wherein the second function is a strictly increasing function of the second power allocation coefficient and the third function is a strictly decreasing function of the second power allocation coefficient.

5. The joint user clustering and power allocation method according to claim 2, wherein the step of pairing each UE in the strong user candidate group with each UE in the weak user candidate group so as to divide the K UEs into the N clusters comprises:

pairing each UE in the strong user candidate group with each UE in the weak user candidate group and calculating the corresponding received SNRs according to the optimal solution of the first power allocation coefficient and the optimal solution of the second power allocation coefficient of each of the pairing combinations; and calculating an equivalent received SNR corresponding to the two UEs in each of the pairing combinations, wherein the equivalent received SNR is a smaller one of the second SNR and the third SNR corresponding to the two UEs plus the first SNR, and dividing the K UEs into the N clusters accordingly.

6. The joint user clustering and power allocation method according to claim 5, wherein the step of dividing the K UEs into the N clusters according to the calculated equivalent received SNR corresponding to each of the pairing combinations comprises:

selecting a first pairing combination having a greatest equivalent received SNR and a second pairing combination having a second greatest equivalent received SNR for each UE in the strong user candidate group according to the calculated equivalent received SNR corresponding to each of the pairing combinations;

calculating an equivalent SNR loss for each UE in the strong user candidate group, wherein the equivalent SNR loss is a difference between the greatest equivalent received SNR and the second greatest equivalent received SNR;

selecting the first pairing combination corresponding to the UE having the equivalent SNR loss being a maximal value from the strong user candidate group to be one of the N clusters;

deleting the two UEs in the selected first pairing combination from the strong user candidate group and the weak user candidate group; and repeating aforementioned steps until both the strong user candidate group and the weak user candidate group are empty.

7. A base station, applicable to cooperative non-orthogonal multiple access (NOMA) systems, and the base station comprise:

a transceiver circuit, configured to transmit messages to K UEs being divided into N clusters, wherein K is an even number greater than or equal to 2 and N=K/2;

a storage circuit, storing a plurality of program codes; and a processing circuit, coupled to the transceiver circuit and the storage circuit, and configured to execute the following operations:

sorting the K UEs in descending order according to K channel gains between the base station and the K UEs;

setting N leading UEs among the sorted UEs as a strong user candidate group, and setting N remaining UEs among the sorted UEs as a weak user candidate group;

pairing each UE in the strong user candidate group with each UE in the weak user candidate group and simultaneously calculating power allocation coefficients and transmission powers corresponding to two UEs in each of pairing combinations so as to divide the K UEs into the N clusters, comprising:

calculating the power allocation coefficients and the transmission powers corresponding to the two UEs based on maximizing a cluster received signal-to-noise ratio (SNR) corresponding to the two UEs for each of the pairing combinations, wherein the two UEs comprise a first UE associated with the strong user candidate group and a second UE associated with the weak user candidate group, the cluster received SNR is a smallest one of received SNRs corresponding to the two UEs, a first channel gain of the first UE is greater than a second channel gain of the second UE, the transmission powers comprise a first transmission power of a first signal to be transmitted to the first UE, a second transmission power of a second signal to be transmitted to the second UE, and a third transmission power for forwarding a decoding result of the second signal from the first UE to the second UE, a sum of the first transmission power, the second transmission power, and the third transmission power is less than or equal to a total transmission power, each of the first transmission power, the second transmission power, and the third transmission power is greater than 0, and the second transmission power is greater than the first transmission power, and the received SNRs corresponding to the two UEs comprise a first SNR of the first signal decoded at the first UE, a second SNR of the second signal decoded at the first UE, and a third SNR of the second signal decoded at the second UE; and transmitting the messages to the K UEs according to the transmission powers corresponding to the UEs in the N clusters.

8. The base station according to claim 7, wherein for each of the pairing combinations, the processing circuit is further configured to execute the following steps:

correspondingly setting the first transmissions power to be $\alpha_n$ times the total transmission power, the second transmission power to be $\beta_n$ times the total transmission power, and the third transmission power to be $(1-\alpha_n-\beta_n)$ times the total transmission power, wherein $\alpha_n$ is defined as a first power allocation coefficient with $0<\alpha_n<1$ and $\beta_n$ is defined as a second power allocation coefficient with $0<\beta_n<1$;

expressing the first SNR by a first function having the first power allocation coefficient, expressing the second SNR by a second function having the first power allocation coefficient and the second power allocation coefficient, and expressing the third SNR by a third function having the first power allocation coefficient and the second power allocation coefficient;

setting a first intersection point of the first function and the second function to be equal to a second intersection point of the first function and the third function so as to obtain a cubic function associated with the first power allocation coefficient;

calculating solutions of the cubic function, wherein one of the solutions is an optimal solution of the first power allocation coefficient;

substituting the optimal solution of the first power allocation coefficient into the second function to calculate an optimal solution of the second power allocation coefficient; and calculating the first transmission power based on the optimal solution of the first power allocation coefficient, calculating the second transmission power based on the optimal solution of the second power allocation coefficient, and calculating the third transmission power based on the optimal solution of the first power allocation coefficient and the optimal solution of the second power allocation coefficient.

9. The base station according to claim 8, wherein the first function is a strictly increasing function of the first power allocation coefficient, and each of the second function and the third function is a strictly decreasing function of the first power allocation coefficient.

10. The base station according to claim 8, wherein the second function is a strictly increasing function of the second power allocation coefficient and the third function is a strictly decreasing function of the second power allocation coefficient.

11. The base station according to claim 8, wherein the processing circuit is further configured to execute:

pairing each UE in the strong user candidate group with each UE in the weak user candidate group and calculating the corresponding received SNRs according to the optimal solution of the first power allocation coefficient and the optimal solution of the second power allocation coefficient of each of the pairing combinations; and calculating an equivalent received SNR corresponding to the two UEs in each of the pairing combinations, wherein the equivalent received SNR is a smaller one of the second SNR and the third SNR corresponding to the two UEs plus the first SNR, and dividing the K UEs into the N clusters accordingly.

12. The base station according to claim 11, wherein the processing circuit is further configured to execute:

selecting a first pairing combination having a greatest equivalent received SNR and a second pairing combination having a second greatest equivalent received SNR for each UE in the strong user candidate group according to the calculated equivalent received SNR corresponding to each of the pairing combinations;

calculating an equivalent SNR loss for each UE in the strong user candidate group, wherein the equivalent SNR loss is a difference between the greatest equivalent received SNR and the second greatest equivalent received SNR;

selecting the first pairing combination corresponding to the UE having the equivalent SNR loss being a maximal value from the strong user candidate group to be one of the N clusters;

deleting the two UEs in the selected first pairing combination from the strong user candidate group and the weak user candidate group; and repeating aforementioned steps until both the strong user candidate group and the weak user candidate group are empty.

* * * * *